United States Patent
Sherman et al.

(10) Patent No.: US 7,111,057 B1
(45) Date of Patent: Sep. 19, 2006

(54) METHOD AND SYSTEM FOR PURGING CONTENT FROM A CONTENT DELIVERY NETWORK

(75) Inventors: Alexander Sherman, Cambridge, MA (US); Philip A. Lisiecki, Quincy, MA (US); Joel M. Wein, Flushing, NY (US); Don A. Dailey, Canton, MA (US); John Dilley, Los Altos, CA (US); William E. Weihl, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 487 days.

(21) Appl. No.: 09/702,521

(22) Filed: Oct. 31, 2000

(51) Int. Cl.
G06F 15/173 (2006.01)
G06F 15/16 (2006.01)
G06F 9/46 (2006.01)
G06F 17/30 (2006.01)
G06F 7/00 (2006.01)
G06F 12/00 (2006.01)

(52) U.S. Cl. ............... 709/223; 709/203; 709/218; 709/219; 709/226; 709/232; 718/101; 707/10; 707/200; 707/201

(58) Field of Classification Search ........ 709/203–204, 709/217–219, 223–226, 231–234, 241; 713/201; 718/101, 102, 105; 707/10, 200, 201
See application file for complete search history.

(56) References Cited

U.S. PATENT DOCUMENTS

| | | | | |
|---|---|---|---|---|
| 5,987,477 A * | 11/1999 | Schmuck et al. | ........... | 707/201 |
| 6,230,205 B1 * | 5/2001 | Garrity et al. | ............... | 709/231 |
| 6,253,283 B1 * | 6/2001 | Yamamoto | ................... | 711/114 |
| 6,345,352 B1 * | 2/2002 | James et al. | ................. | 711/210 |
| 6,405,252 B1 | 6/2002 | Gupta et al. | | |
| 6,421,781 B1 * | 7/2002 | Fox et al. | .................... | 713/201 |
| 6,442,551 B1 * | 8/2002 | Ofek | .......................... | 707/10 |
| 6,502,125 B1 * | 12/2002 | Kenner et al. | .............. | 709/203 |
| 6,553,413 B1 | 4/2003 | Leighton et al. | ............ | 709/219 |
| 6,591,266 B1 * | 7/2003 | Li et al. | ........................ | 707/10 |
| 6,654,807 B1 * | 11/2003 | Farber et al. | ................ | 709/225 |
| 6,732,361 B1 * | 5/2004 | Andreoli et al. | ............ | 719/313 |
| 6,754,699 B1 * | 6/2004 | Swildens et al. | ........... | 709/217 |
| 6,795,868 B1 * | 9/2004 | Dingman et al. | ........... | 709/246 |
| 6,799,221 B1 * | 9/2004 | Kenner et al. | .............. | 709/245 |
| 2002/0066033 A1* | 5/2002 | Dobbins | ...................... | 713/201 |

OTHER PUBLICATIONS

Xiao Luo and Muzio, J. C. "A fault-tolerant multiprocessor cache memory," Records of the IEEE Intl. Workshop on Memory Technology, Design and Testing, Aug. 8-9, 1994, pp. 52-57.*

(Continued)

*Primary Examiner*—Jason Cardone
*Assistant Examiner*—Melvin H. Pollack
(74) *Attorney, Agent, or Firm*—David H. Judson

(57) ABSTRACT

A content file purge mechanism for a content delivery network (CDN) is described. A Web-enabled portal is used by CDN customers to enter purge requests securely. A purge request identifies one or more content files to be purged. The purge request is pushed over a secure link from the portal to a purge server, which validates purge requests from multiple CDN customers and batches the requests into an aggregate purge request. The aggregate purge request is pushed from the purge server to a set of staging servers. Periodically, CDN content servers poll the staging servers to determine whether an aggregate purge request exists. If so, the CDN content servers obtain the aggregate purge request and process the request to remove the identified content files from their local storage.

9 Claims, 7 Drawing Sheets

OTHER PUBLICATIONS

Kim, Jong-Hoon et al. "An Efficient Caching Scheme for Software RAID File Systems in Workstation Clusters," High Performance Computing on the Information Superhighway, Apr. 28-May 2, 1997, pp. 331-336.*

Kim, Jong-Hoon et al. "Striping and Buffer Caching for Software RAID File Systems in Workstation Clusters," 19th IEEE Intl. Conference on Distributed Computing Systems, May 31-Jun. 4, 1999, pp. 544-551.*

* cited by examiner

ARL purge results for ABC Technologies

Your purge request has been submitted to the ABC system. Your purge request id code is: 782. Please record this number for future reference. The estimated maximum completion time for this request is: 480 secs.

The following ARLs have been submitted:

| # | ARL | Purge status |
|---|---|---|
| 1 | http:///f/4/550/4d/build.ABC.com/cqi-bin/test.pl | Submitted |

*FIG. 6*

METHOD AND SYSTEM FOR PURGING CONTENT FROM A CONTENT DELIVERY NETWORK

BACKGROUND OF THE INVENTION

1. Technical Field

The present invention relates generally to high-performance, fault-tolerant web content delivery.

2. Description of the Related Art

It is known in the prior art to distribute media-rich web objects away from busy home sites to a network of content servers located across multiple major Internet backbone networks. One such service (CDS) is known as FreeFlow<sup>SM</sup> content delivery, which is available from Akamai Technologies, Inc. of Cambridge, Mass. Akamai operates a global content delivery network (CDN) comprising a large number of distributed content servers, network mapping servers, and associated mechanisms to track reporting and administration of its content delivery service. The Akamai content servers are typically located at edge-of-network access points such as Internet Points-of-Presence (POPs).

In operation of the FreeFlow content delivery service, a software tool is used to tag embedded web page objects, such as graphics and images, for delivery via the CDN. Typically, the objects are tagged by transforming web page Uniform Resource Locators (URLs) that identify those objects. The objects identified by the modified URLs are then hosted on the CDN content servers. In one typical user interaction with a web site enabled by FreeFlow, the user's browser sends a request for a web page to the site. In response, the web site returns the page markup language (e.g., HTML) code as usual, except that the embedded object URLs have been modified to point to the content delivery network. As a result, the browser next requests and tries to obtain the media-rich embedded objects from an optimally-located CDN server, instead of from the content provider's site. The above-described web content delivery service provides significant advantages, namely, faster downloads for end-users, reduced load on the home site, flash crowd protection, easier web site management and infrastructure scaling, and the ability to distribute media-rich objects effectively. Further details of the Akamai CDN and service are described in U.S. Pat. No. 6,108,703, which is incorporated herein by reference.

CDN customers (namely, content providers) may want to purge objects from the CDN from time-to-time. This need may arise, for example, because the customer has published the wrong object and needs to remove it before the object's normal time-to-live (TTL) expires. Another reason a customer may desire to purge an object is because an error occurred during the tagging of the object, e.g., an object is given a 1-day TTL instead of a 30 minute TTL. Other reasons purging may be required are unauthorized publishing of an object, publishing an object with the wrong object name, or the like. CDN system administrators may also have a need to purge given content. In addition, where CDN servers are used to provide dynamic content assembly on behalf of the content provider, it is desired to maintain the content provider's publishing and content management environment, and such environment may include the ability to remove particular content.

To this end, it would be desirable to provide a mechanism to enable the CDN content provider customer and/or the CDN administrator the ability to selectively remove content from the CDN. The present invention addresses this need.

BRIEF SUMMARY OF THE INVENTION

A CDN purge mechanism preferably includes a number of components. A Web-enabled portal preferably is used by customers to enter purge requests securely. A particular purge request typically identifies a set of one or more content files to be purged from the content delivery network. The purge request is pushed over a secure link from the portal to a purge server, which validates purge requests from multiple CDN customers and batches the requests into an aggregate purge request. The aggregate purge request is pushed over a secure link from the purge server to a set of staging servers throughout the content delivery network. Periodically, CDN content servers poll the staging servers to determine whether an aggregate purge request exists. If so, the CDN content servers pull (or otherwise obtain) the aggregate purge request over a secure link and process the request to remove the identified content files from their local storage. Throughout the purge process, notifications are sent when purges are accepted, rejected, and upon completion.

As is well known, given content servers in the content delivery network may share content, e.g., through use of the InterCache Protocol (ICP). According to another technical advantage of the invention, each control server includes an appropriate control routine to prevent exchange of stale data (i.e., to ensure consistency) between the content server and other content servers that are sharing content in this manner. This functionality preferably uses purge sequence numbers to enable content servers to synchronize their purge states so that stale content is not exchanged between servers.

According to yet another technical advantage, a given content server may leverage the content delivery network itself to obtain purge request files from a given staging server. The given content server may then share the purge request files with one or more other content servers (e.g., in a region of content servers) using ICP or some other communication protocol. This reduces the load on a given staging server.

The foregoing has outlined some of the more pertinent features of the present invention. These features should be construed to be merely illustrative. Many other beneficial results can be attained by applying the disclosed invention in a different manner or by modifying the invention as will be described. Accordingly, other features and a fuller understanding of the invention may be had by referring to the following Detailed Description of the Preferred Embodiment.

BRIEF DESCRIPTION OF THE DRAWINGS

FIG. 6 is a representative confirmation dialog indicating that a purge request has been submitted to the mechanism.

DETAILED DESCRIPTION OF THE PREFERRED EMBODIMENT

Figure 1:
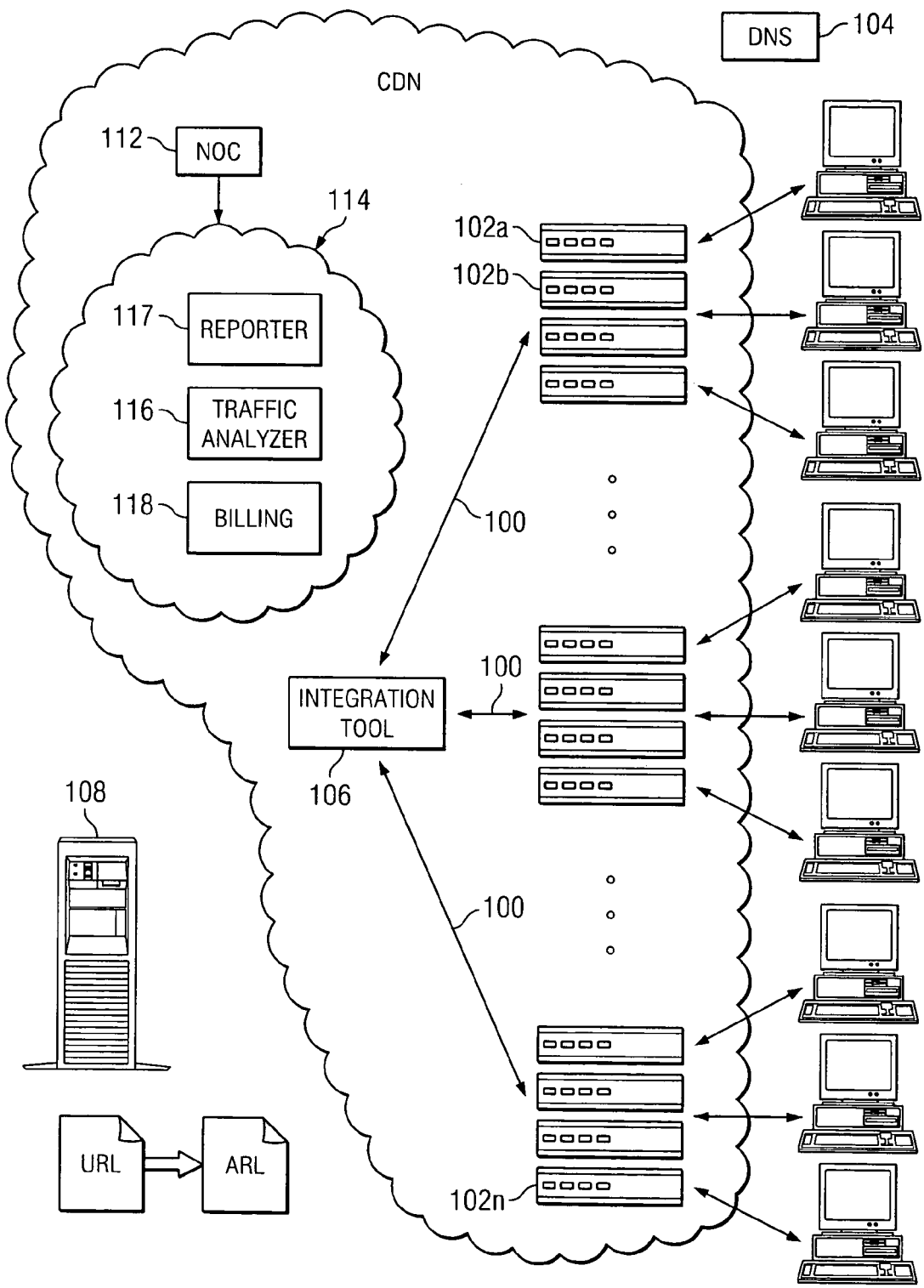
FIG. 1 is a block diagram of a known content delivery service in which the present invention may be implemented.

FIG. 1 is a diagram showing an illustrative content delivery service in which the present invention may be implemented. The invention may likewise be implemented with other known or later-designed or built content delivery services or systems. In the illustrative embodiment, the content delivery service (CDS) comprises a preferably global content delivery network (CDN) 100 of content delivery servers 102a–n, a dynamic domain name service (DNS) system 104, and a tool 106 that allows content to be tagged for inclusion on the network. Generally, the content delivery service allows the network of content delivery servers 102a–n to serve a large number of clients efficiently. Although not meant to be limiting, a typical server (such as content server 102) is a Pentium-based caching appliance running the Linux operating system with a large amount of RAM and disk storage. As also seen in FIG. 1, the content delivery service may include a network operations center (NOC) 112 for monitoring the network to ensure that key processes are running, systems have not exceeded capacity, and that sets of content servers (so-called regions) are interacting properly. A content provider may also have access to a monitoring suite 114 that includes tools for both real-time and historic analysis of customer data. One tool is a traffic analyzer 116 that provides multiple monitoring views that enable quick access to network and customer-specific traffic information. A reporter 118 allows for viewing of historical data. A billing tool 118 may be used to generate appropriate billing information for the content provider, who typically pays for the service as a function of the amount of content delivered by the CDN.

Figure 2:
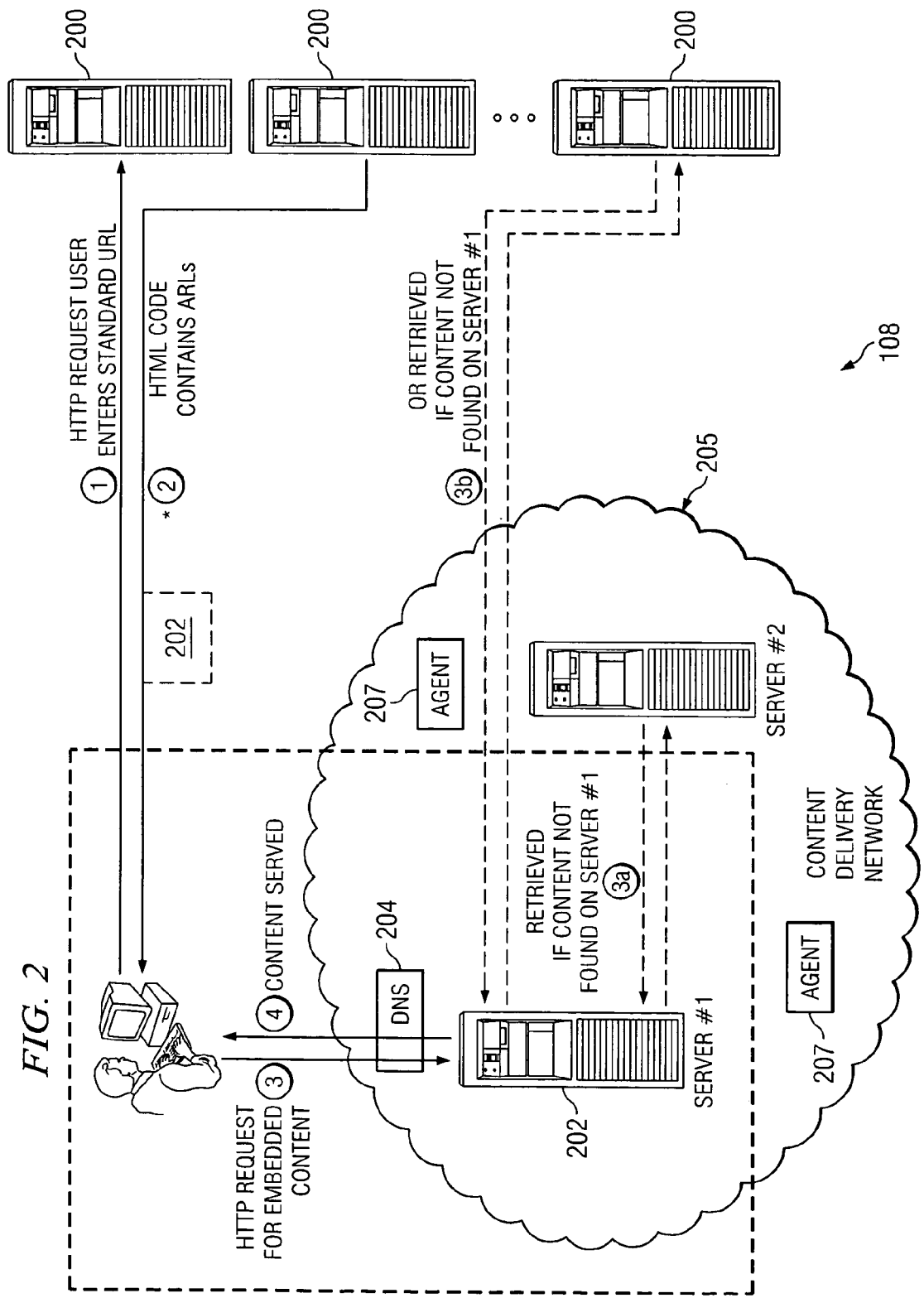
FIG. 2 is a simplified diagram illustrating how the content delivery service operates to serve given content such as graphics and images from a set of CDN content servers preferably located at network access points.

High-performance content delivery is provided by directing requests for web objects (e.g., graphics, images, streaming media, HTML and the like) to the content delivery service network. In one known technique, known as Akamai FreeFlow content delivery, content is first tagged for delivery by the tool 106, which, for example, may be executed by a content provider at the content provider's web site 108. Site 108 is sometimes referred to as an origin server. The tool 106 converts web page URLs to modified resource locators, called ARLs for convenience. FIG. 2 illustrates how the origin server 208 operates after given embedded objects in a web page have been modified with ARLs. As illustrated, the origin server 200 preferably still serves the basic or "base" HTML page 202, although this is not a requirement. Because the URLs of the embedded objects within the page have been modified (e.g., into ARLs), the objects preferentially are served from the CDN content servers 204 as opposed to the origin server. CDN content servers preferably are located at network access points (e.g., Internet Points-of-Presence) so that the content is closer to requesting end users. If a given requested object is not available from a given content server, the object may be retrieved from another CDN content server or, failing that, from the origin server.

According to the present invention, the above-described content delivery network is enhanced to enable the content provider customers and CDN administrators the ability to evict or "purge" content from all or some of the CDN content servers efficiently and reliably. There may be many reasons why it becomes necessary to remove such content. Thus, for example, the customer may have published the wrong object and needs to remove it before the object's normal time-to-live (TTL) expires. Another reason a customer may desire to purge an object is because an error occurred during the tagging of the object, e.g., an object is given a 1-day TTL instead of a 30 minute TTL. Other reasons purging may be required are unauthorized publishing of an object, publishing an object with the wrong object name, or the like. In addition, where CDN servers are used to provide dynamic content assembly on behalf of the content provider, it is desirable to maintain the content provider's publishing and content management environment, which may include the ability to remove given content from the page.

Figure 3:
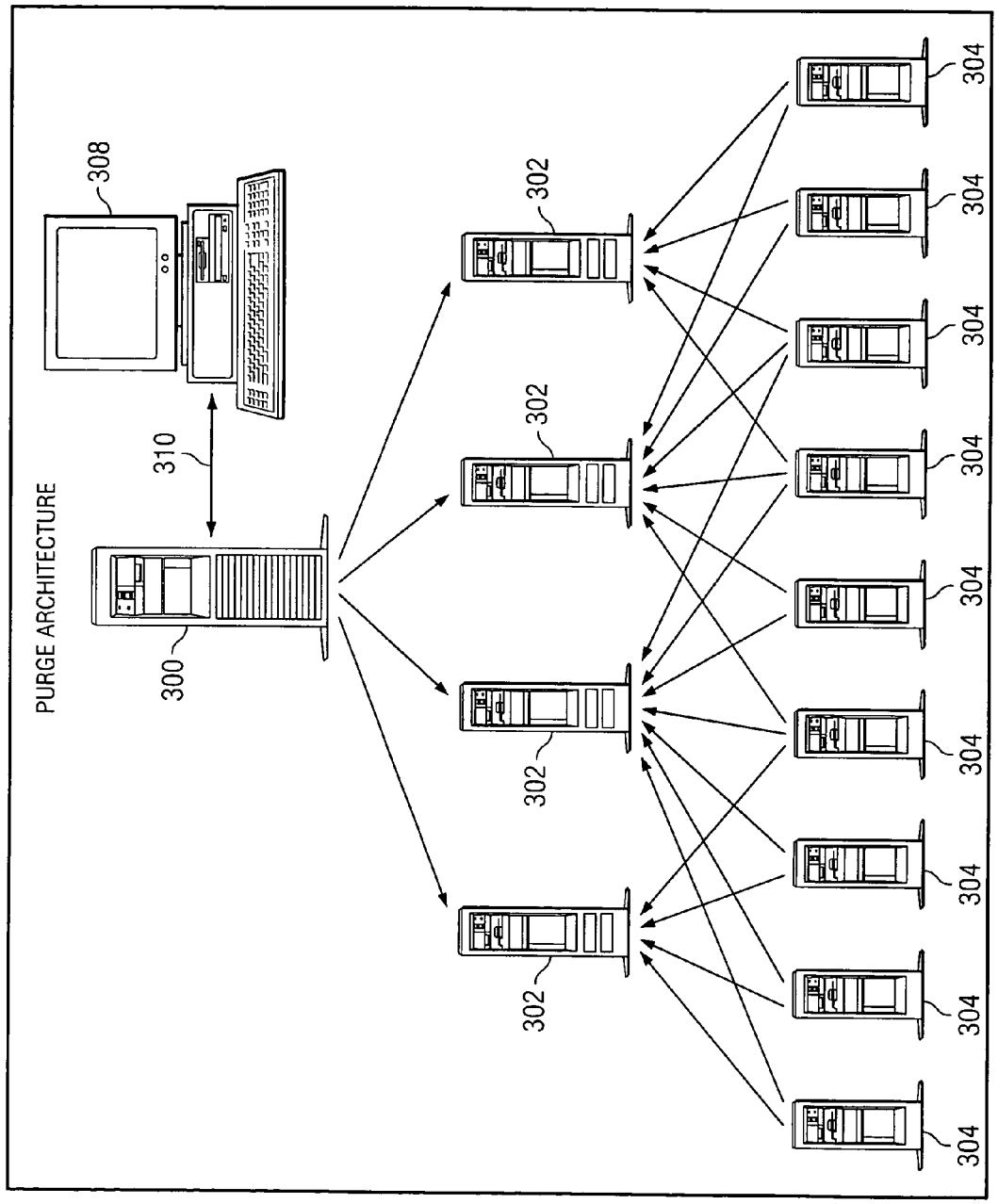
FIG. 3 is a simplified diagram illustrating a purge mechanism architecture according to the present invention.

FIG. 3 illustrates a representative purge mechanism at a high level. In the illustrative embodiment, the purge mechanism comprises three (3) main subsystems or components: a purge server 300, a set of staging servers 302, and the CDN content servers 304. The purge server 300 preferably originates all purge requests on the CDN. In the illustrated example, the purge server 300 receives purge requests from authorized CDN customers who enter them, for example, via a user interface (to be described below) available on a customer-facing portal site 306. The portal site 308 typically is an extranet application that may be accessed using a web browser over the Internet or other computer network. Communications between the portal site and the purge server preferably occur over a secure and authenticated (e.g., SSL) link 310. The staging servers 302 process accepted purge requests. In particular, the staging servers preferably store purge requests to be requested by the content servers 304. The content servers 304 are the CDN "edge" servers that actually deliver customer content to requesting end users. In the illustrative embodiment, a content server 304 is modified to facilitate the purge functionality as will be described in more detail below.

The purge server 300, which may be implemented in a redundant manner using a buddy server, is the main receiving and collection point for all purges. In operation, CDN customers log into the customer portal and enter purge requests to the purge server 300. In a preferred embodiment, the purge server 300 is responsible for receiving purge requests, validating the purge requests, issuing a purge identifier (ID) for each request, batching purge requests, and pushing them to the staging servers. A batch of purge requests is sometimes referred to herein as an aggregate purge request because it includes purge requests from multiple CDN customers. Preferably, the purge server 300 also regularly polls the content servers 304 to determine when purges are completed. Once a purge is complete, the purge server sends notification to the customer, e.g., by e-mail.

The staging servers 302 preferably are geographically distributed across the CDN and receive purge batches from the purge server 300. The staging server's role is to hold purge requests for communication to the content servers. A given CDN content server may communicate with a given staging server, or a set of such servers. Preferably, the staging servers establish and manage all connections between purge requests and the CDN. All communication between the staging servers and the content servers preferably occurs via secure and encrypted communication. Preferably, a staging server uses an HTTP server (e.g., Apache) to deliver the purge requests, and those requests may be compressed prior to transmission. As will be described in more detail below, in a preferred embodiment, the content servers 304 periodically contact the staging servers to check for new or waiting purge requests. Once content servers receive a purge request, they remove the content from their system.

In a preferred embodiment, a given content server may use the content delivery network itself to obtain the purge request. This reduces the load on the staging server components of the purge system. In addition, if content servers (e.g., a set of servers within a CDN region) are sharing content, a given content server may share the purge request with other content servers, e.g., using ICP. An illustrative embodiment of this function is described below.

Figure 4:
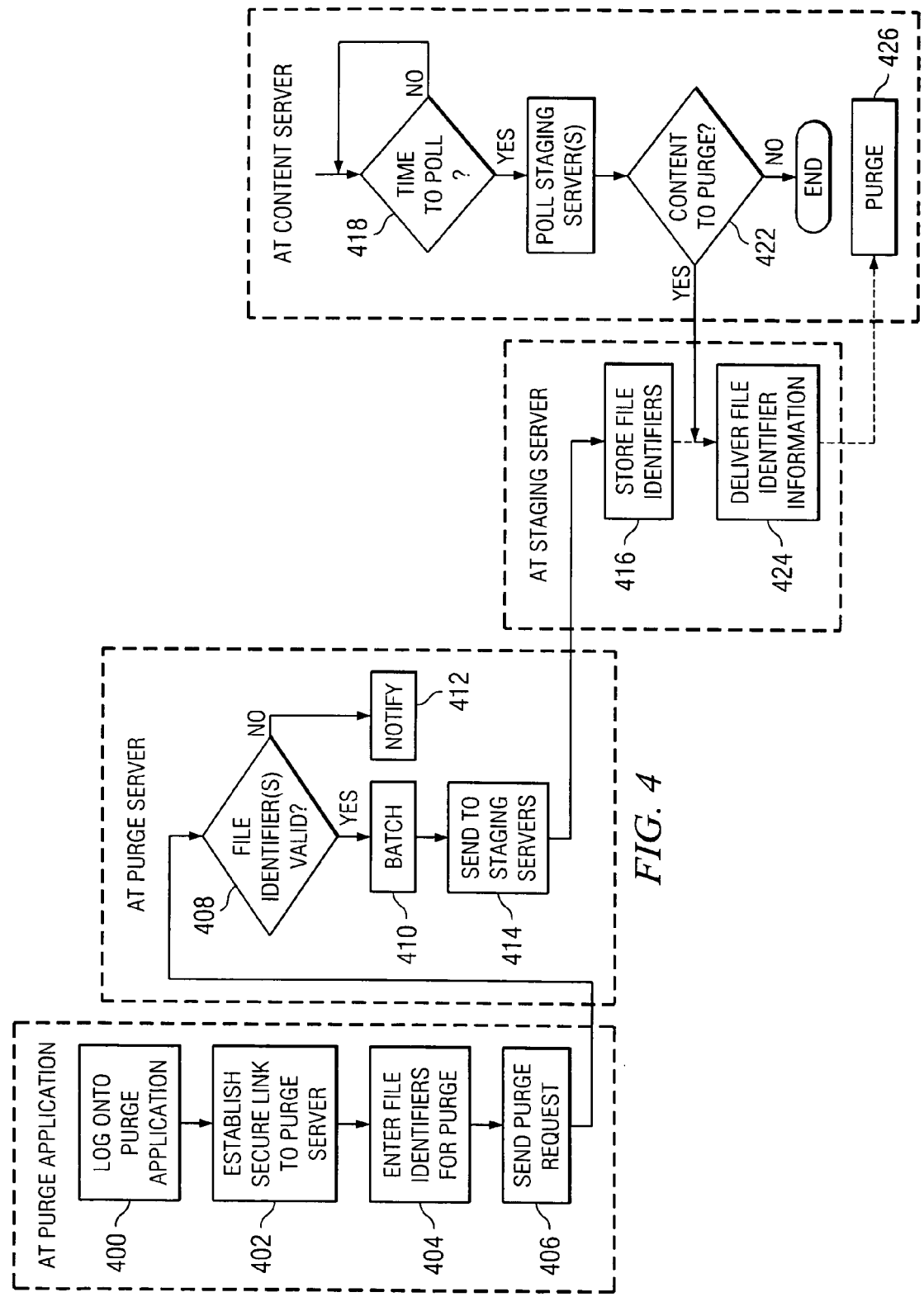
FIG. 4 is a flowchart of a preferred purge process according to the present invention.

FIG. 4 illustrates a simplified flowchart of a preferred purge process of the present invention. Individual process steps are associated with the components, namely, the portal, the purge server, the staging server, or the content server, as the case may be. As noted above, generally the purge server receives and batches purge requests, while checking their validity. Validated purges are then pushed to the staging servers from which they are later pulled, in particular, by the individual CDN content servers. The workflow of the purge begins at step 400 when the customer (in this example) logs into the purge application. As noted above, preferably, the application is an extranet application accessible over the Internet via a secure and authenticated (e.g., SSL) connection. At step 402, a secure link is established between the application and the purge server. At step 404, the user enters content file identifiers targeted for purging. In Akamai FreeFlow, for example, a content file identifier is sometimes referred to as an ARL. At step 406, these ARL(s) are then sent to the purge server. The process then continues at the purge server at step 408, which checks the validity of the ARL. If valid, the process continues at step 410 with the ARL being batched with other ARLs for purging. If the ARL is invalid or the purge otherwise fails, the process branches to step 412, wherein the purge server notifies the user of the failure.

At step 414, the ARLs of the accepted purges are sent, preferably in batch, to the staging servers for removal from the system. At step 416, the ARLs are stored on the staging servers. The process then continues at each of the respective content servers. In particular, preferably, an ARL is removed from the CDN via an internal communication infrastructure whereby the CDN content server (or, alternatively, a CDN on its behalf) regularly polls the staging server to check for purges. Thus, at step 418, a test is performed at a given content server to determine whether it is time to poll the staging server(s). A given content server may poll one or more such staging servers. If the outcome of the test is negative, the routine cycles. If, however, the outcome of the test is positive, the content server polls the staging servers at step 420. A test is then executed at step 422 to determine whether there is content to be purged. If not, the routine ends. If the outcome of the test at step 422 indicates that there is content to be purged, at step 424, the staging servers securely send the information to the polling content server. At step 426, each content server removes the content, which results in the content being removed from the CDN.

Thus, in the preferred embodiment, the process of removing a piece of content from the CDN is a combination of both push and pull operations. Customers push the requested ARLs (or other content file identifiers) onto the purge server, where they are subsequently pushed to the staging servers. An individual CDN server then pulls the content to be removed from the staging servers. The pulling methodology allows individual servers to keep track of whether they have up-to-date information and to proactively update themselves. Because the purge mechanism preferably uses a pull operation for the last step, the CDN can have a high degree of confidence that content targeted for removal will actually be removed regardless of network conditions or server availability.

Figure 5:
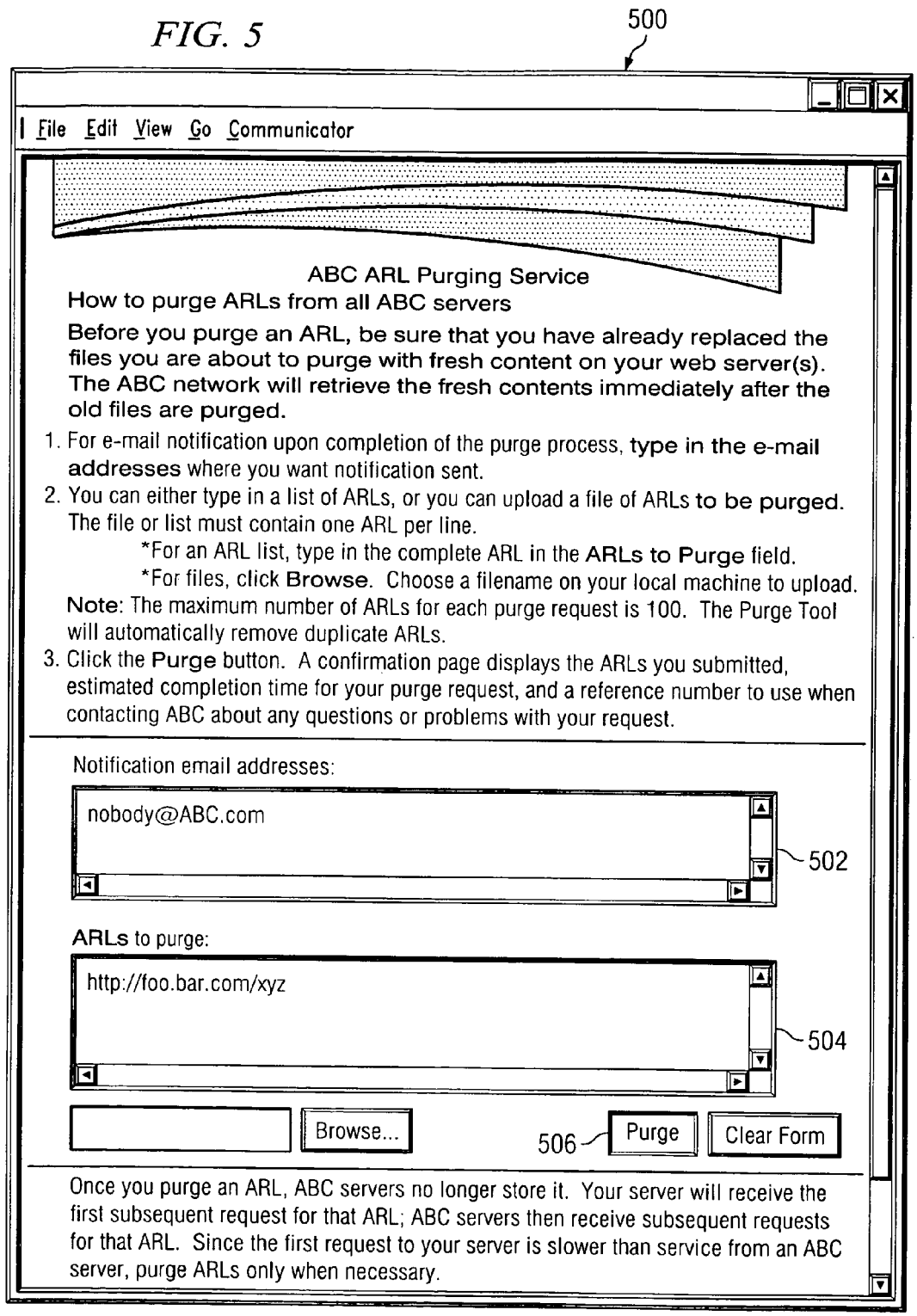
FIG. 5 is a representative purge tool user interface that may be used by a content provider customer or CDN administrator to identify a given object to be purged from the CDN.

Preferably, access to the purge mechanism requires a username and password. Authorized customers obtain access to the purge mechanism, e.g., from a "Tools" section of the CDN customer portal. Once logged into the system, customers can only purge content that is associated with their username and password. FIG. 5 illustrates a representative user interface dialog 500 for the purge tool. To enter a purge, the user preferably enters an e-mail address for notification in field 502, together with the ARLs that are to be purged in field 504. The e-mail field 502, of course, is optional. If no e-mail address is given, then no notification of completion is sent. Preferably, all purge e-mail notifications are archived. The ARL field 504 is where customers enter the ARL or group of ARLs to be purged. As used here, an ARL may refer to the origin server URL, to the origin server URL as modified or tagged by the CDN, or to any portion of the origin server URL. Preferably, the customer enters one ARL per line. Alternatively, customers can point to a text file on their local machine containing a list of ARLs to be purged.

Once the e-mail address and ARLs are entered, the purge is not complete until the user selects the purge button 506. When the purge button is selected, a purge request is sent to the purge server as previously described. The purge server checks that the username is authorized to purge the designated ARLs and returns a notification to the user. If accepted, the purge server returns a message such as shown in FIG. 6. As seen, the notification indicates that the purge has been accepted, and it includes an ID code (e.g., 782) for the purge, and an estimated time for completion (e.g., 480 seconds). The notification also provides a summary of the ARLs to be purged and their status.

During the purge process, the mechanism preferably provides a series of notifications. Notifications may be sent when purges are accepted, rejected, and upon completion. Accepted and rejected notifications occur, for example, on the customer web portal. Completion notifications preferably are sent via e-mail to the designated e-mail address(es).

Because purging content is a sensitive content management action, the purge mechanism includes a number of security mechanisms. As noted above, customers must obtain a special username and password for accessing the purge tool. This username preferably is unique to each customer and determines from which domains they are authorized to purge objects. Customers will only be able to purge ARLs from these designated domains. As also described above, preferably all communication within the purge communication infrastructure occurs securely. This includes communication between the various components and communication with the customer.

Preferably, the purge server is designed to purge requests together and send them to the staging server(s) when it is determined that the system can process these requests without degradation to the content delivery service being provided by the CDN. Once the requests are sent to the staging servers, the objects will be removed from the content delivery network. Typically, purges are completed within a short time period, e.g., every few minutes.

Figure 7:
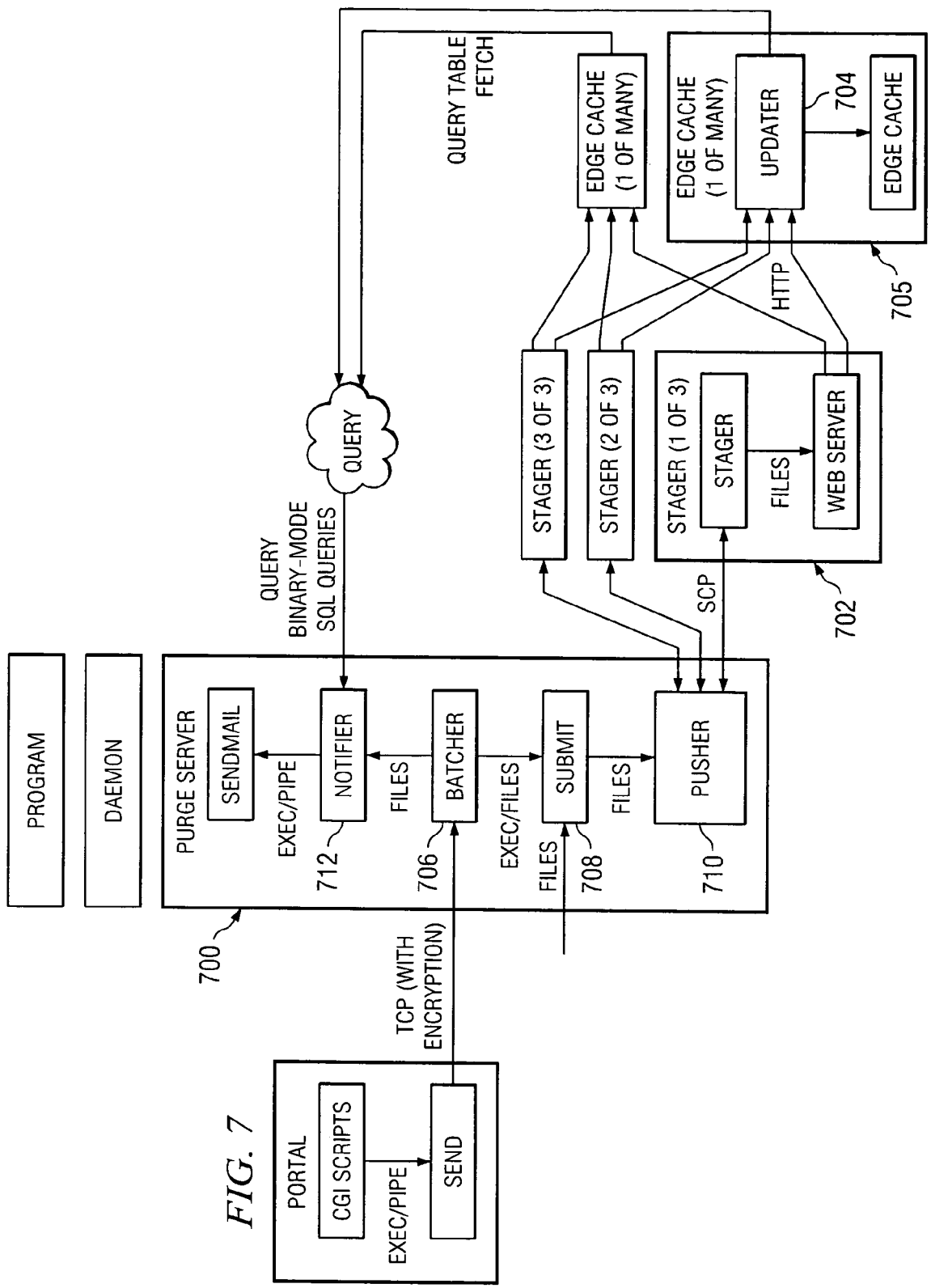
FIG. 7 is a more detailed illustration of the various processes that comprise the purge mechanism of the present invention.

The following is a detailed description of an implementation of the purge mechanism of the present invention. FIG. 7 illustrates the various processes described below.

1. Introduction

The purge system allows customers and system administrators the ability to evict stale content from all of the CDN content servers efficiently and reliably.

2. Terminology

Purging (Web) Server 700: a web server where users can log in and submit a session request.

Session Request: a set of object names (such as CDN modified URLs or "ARLs") submitted by a user for purging.

Purge Batch: a set of object names to be purged grouped into one unit by the Purging Server. (A Session Request may be broken into multiple Purge Batches, and a Purge Batch may contain object names from different Session Requests). Batches preferably are used as a unit of publishing requests to the CDN although this is not a requirement of the invention.

Staging Server (stager) 702: a server that publishes purge information to the CDN.

Pending Purge Requests: purge requests that have not yet been made available (or published) to the content delivery network.

Updater 704: The updater process runs on a content server machine 705 and is responsible for fetching published purged updates and purge instructions from a stager and purging its local content server accordingly.

Purge Request Protocol: a protocol for communicating purge updates to content server. (Updater and content server communicate through this protocol)

3. Overview

The Purge System components comprise: purge GUI, Purge-Batcher 706, submit program 708, (file) Pusher 710, Staging Servers (stagers) 702, Updaters 704, content servers 705, User Notifier 712.

The following is the high level overview of the system.

1. The CDN extranet leads the users to the Purge Server 700.
2. The Purging Web Server GUI allows users to login and submit purge requests through the UI. Session Requests are submitted by the GUI to the Purge-Batcher 706 that runs on the Purge Server 700.
3. The Purge-Batcher 706 splits the list of object names into Purge Batches, assigns global purge sequence numbers to these batches and submits them for dissemination to all of the content servers. (Content servers use the sequence numbers to keep track of the latest purge batches that they processed and for purge data consistency.)
4. The Pusher 710 pushes the batch files out to the Staging Servers 702.
5. The Staging Server machines make the purge batches available for download for the rest of the CDN. Staging Servers are used to reduce the load that may be placed on the Web servers, and to increase their availability and network accessibility.
6. Updaters 704 sitting on all the content server machines 705 periodically fetch the Purge Batches by making requests to one of the Stagers 702 for the next sequence number, or for a directives file which contains the range of valid purge sequence numbers. Updaters purge their local content servers with these Purge Batches. To reduce the load on the Stagers, updaters preferably leverage the content delivery network to pull the purge data. Updaters and content servers can report their current purge sequence number to a monitoring system to help monitor purge progress.
7. User Notifier notifies customers when their Session Requests are completed, i.e., all reachable updaters report that the purge is complete.

4. GUI

The user interface allows clients to schedule a set of object names to be purged; this set of object names is called a session request. A user is given a unique request id. At a later time, notification may be sent to the user for the given id. Purge requests may also be submitted to the system via a programmatic interface which securely conveys purge requests to the Purge-batcher.

4.1. Inputs

From User: On the initial screen this will be the username and password; on the purge screen either a list of object names or a filename of object names to upload. The GUI may maintain a list of default email notification addresses. Optionally, the user may change or add additional email addresses for a given notification.

From the Purging Server: A list of access controls that will specify which objects can be purged by each user, and what priority is given to each user, and the maximum number of object names this user may have pending.

From the Purge-Batcher: Errors from submission or assigned request ID and completion time estimate.

4.2. Outputs

Outputs to User:

Request Accepted Screen, including Request ID and an estimate of maximum time the purge should take.

Purging Service Not Available Screen.

Bad Purge Request Screen. (Too many pending object names, not authorized to purge these objects, badly formatted object names, etc.) A purge request with errors will not be scheduled; the errors should be fixed and then the request may be resubmitted.

Output to local disk: Log the session request that includes a list of object names, its request ID, and user email addresses to which user is to be notified.

Output to Purge-Batcher: A session request that includes a list of object names, customer name (for scheduling policy), maximum outstanding object names, priority of that user and user email addresses to which user is to be notified.

4.3. Normal Behavior

A customer connects to the Purging Server GUI via the extranet and supplies a list of object names to purge (enter a list, cut and paste a list, or provide a file containing object names). In addition, the GUI receives an access control list that includes, for example, content provider codes that the user is allowed to purge and the priority of that user.

The GUI contacts the Purge-Batcher using a secure, encrypted, and authenticated protocol, sends the session request, and receives a reply.

The Purge-Batcher checks the list of object names being submitted for correctness. If any of the object names do not validate returns "Bad Purge Request" screen with an object name that failed.

If the GUI receives a valid request ID, it logs the session request and returns request ID to the user. If not, the GUI generates an error page.

The GUI itself preferably comprises two sub-components: a CGI script, servlet, or equivalent, and a purge session request send program. The CGI script will take the input from the user's form and from the user's account information and format a session request. The submission program will contact the Purge-Batcher to send the purge session request, and receive a session request ID and an estimate of the maximum completion time of the purge. Once the Purge-Batcher has assigned a session request ID and returned it to the submission program, a copy of the session request is written to disk on the GUI machine (by the GUI) as a backup. The session request ID is returned to the CGI script. If any object names are invalid, the Purge-batcher cannot be contacted, or some other error occurs, a descriptive error message is returned to the CGI script, in the format described below. The CGI script should then present the session request ID along with a general description of the meaning of this ID, or an error screen including the error generated by the submission program.

4.3.1. Logging

The GUI logs for each session request: the status of the request (whether the request was allowed and if so request ID), list of object names, customer contact info, priority, and any customer-specific information.

5. Overview of Purge Server Machine

The Purge server is responsible for collecting all purge requests and, optionally, other requests, scheduling them for dissemination to the content delivery network, and making the necessary files available to the stager machines for download by the updaters. These functions may, of course, also be split among several distinct server machines.

5.1. Inputs

Session requests from the GUI machines, purge files from the user (if provided), and status information from the stager machines.

5.2. Outputs

Encrypted purge files to the staging servers. Reports various status tables to query. Sends email to customers when purges complete.

5.3. Normal Behavior

To accomplish these functions, the purge server runs a variety of programs. The Purge-Batcher daemon receives "session requests" from the GUI machines and breaks them up into smaller "batches" which are handed off to a Submit process one at a time. The Submit process takes the batches, as well as any metadata files, and makes them available to the file pusher. The file pusher takes these files and makes them available to the stager machines. This machine also runs a User Notifier process that determines when purge session requests have been completed (using output from the Purge-Batcher and data gathered from the Updaters) and then sends email to the customer.

6. User Notifier Process

6.1. Inputs:

From Purge-Batcher:
Email addresses to notify when a given session request in complete.
Which session requests a given purge batch completes, i.e., after that batch and all previous batches are purged, no object names from these session requests remain to be purged.
From Content Servers: Which servers have completed which purge batches.

6.2. Outputs:

Notification emails to users.

6.3. Normal Behavior

Polls the content servers to find the greatest purge sequence number has been propagated to all of the content servers. Historical data may be kept for several minutes and multiple redundant data sources may be consulted to improve data quality.

7. Purge Batcher

The Purge-Batcher is a process that may run on the same machine as the Pusher and is responsible for organizing customer session requests into Purge Batches and submitting the batch files together with a directives file to the system.

7.1. Inputs

From the Purge Sender: Session requests. Note that the Purge-batcher has to handle multiple User Interfaces contacting Purge-Batcher simultaneously.

7.2. Outputs

To Purge Sender: Replies with request ID and completion estimate on success or an error message on failure when a session request is submitted.
To Pusher: Regularly submits purge batches files and the "directives file" to the Pusher. Old purge batches may eventually be deleted when it is known that all content servers have seen them.
To User Notifier: Information about sessions and batches, as defined in the User Notifier section.

7.3. Normal Behavior

The Purge-Batcher receives session requests from the purge sender, as discussed previously. The Purge-Batcher checks the validity of all of the object names in the session request, tests whether they belong to the user submitting the purge request, and then makes the request available to the main Purge-Batcher scheduling algorithm.

The Purge-Batcher periodically creates purge batches from the pending session requests, attempting to distribute users' requests fairly, without forming batches that are too large.

Once a batch is completed it is submitted to the Pusher as a file with a sequence number as part of its name. (e.g. purgebatch27). The Purge-Batcher submits the new batches followed by the new "directives" file, which describes the range of valid existing batches, e.g., "10–1723" (see the Updater section below for more detail on directives).

A batch file is merely a text file that lists object names, along with any other information deemed necessary.

7.3.1. Logging

Once the submission occurs, Purge-Batcher logs the batch that is has scheduled.

7.3.2. Variants

The Purge-Batcher may be made redundant and fault-tolerant using a variety of techniques. One approach is to have each Purge-Batcher use an independent numbering sequence and have the updaters/content servers fetch from all of these sequences. A simpler approach is to use leader election and data replication among a set of Purge-Batchers to allow an automatic fail-over. This process can leverage the fact that once a batch is published to any stager or content server, it can never be changed, but it can be replaced by an empty batch, so long as any objects formerly listed in that batch are later rescheduled.

8. Pusher submission

The Purge-Batcher needs the ability to submit files to the Pusher. This may be accomplished by a stand-alone program that is executed by the Purge-Batcher, or by some other programmatic or network interface.

9. Pusher

The pusher is responsible for pushing scheduled files to all of the stagers intelligently, minimizing the amount of traffic and time (latency) that it takes to push new files.

9.1. Inputs

New files to push.

9.2. Outputs

To Stagers: encrypted packed files, an index file, and a heartbeat file.

9.3. Behavior

Pusher packs, encrypts, and signs all submitted files using a shared private key or public key cryptography and pushes them out to the stagers. It also pushes out an INDEX file that describes all the data files and a heartbeat file.

9.3.1. Logging

Pusher logs new submissions, new pushes of data, and stager unreachable messages.

9.3.2. Reporting

For purges, pusher reports the latest purge sequence number, the smallest purge sequence number, and the number of files missing in that range.

9.3.3. Variants

The Pusher can be made more fault-tolerant by allowing multiple Pushers to push to a single stager; as long as any Pusher is alive, the system will function.

10. Staging Server

10.1. Inputs

Index file, encrypted/packed files from the Pusher, heartbeat files.

10.2. Outputs

Encrypted files to its web server (e.g., an HTTP Apache server) for download by the updaters, and a stager index file, to be picked up by the Pusher.

10.3. Normal Behavior

Every few seconds reads the index file. If the index file is valid and contains new timestamps for one or more of the purge or metadata files, and if the MD5 checksums listed for each file are correct, it places the new encrypted purge files on its web server for download by the updaters. The stager periodically reconstructs the stager index file. This file lists all of the files available for download from the stager together with their timestamps and sizes. This file is later checked by the pusher to see which files are missing. Every time a stager downloads gets a valid INDEX file, it will delete all files that are not listed in the INDEX file.

10.3.1. Logging

Logs when something new is staged, logs when heartbeat file has not been updated, e.g., because it cannot be reached by the Pusher.

10.3.2. Variants

The stagers may pull data from the Pusher instead of relying on the Pusher to push changes.

11. Updater

The Updater fetches the directives file and purge batches files from the stagers and makes them available to its content server.

11.1. Inputs

Encrypted/packed purge batch files and a directives file from a stager. Acknowledgments from content server on notifications.

11.2. Outputs

Decrypted and unpacked purge files and directives file. Notifications and purge requests to content server.

11.3. Normal Behavior

The purge functionality of an Updater can be modeled as two state machines: a regular fetch thread that fetches the directives file (as well as, optionally, other files), and a purge thread that fetches purge batch files and notifies a content server about them. For simplicity, only the purging thread and the part of the fetch thread related to the directives file are discussed. All fetch wait timeouts preferably are randomized to keep them spread out in time.

11.3.1. Updater to Stager State Machine: Fetching and Processing Directives File 1. The fetching thread of the Updater wakes up and performs a query for the directives file (Idle→GET). If no new file exists or if the request fails, it goes back to idle (GET→Idle). This request may be an IMS (If-Modified-Since:) HTTP request, or may use some other protocol. This request may be made through a content delivery network.
2. If the thread is successful in getting the file, it tries to move the file atomically to its permanent location (GET→Move). It also broadcasts the contents of the file to other nearby Updaters. It then moves back to the Idle state regardless of success or failure but reports any failures (Move-Idle).
3. In the presence of a directives file broadcast, the system examines the broadcast purge sequence values against the ones it has stored locally. Broadcasts from unrecognized Updaters or from itself are ignored. If the broadcast represents newer information, the thread accepts the new values, creates a file and stores it in its permanent location. It also resets the timeout it uses to wakeup and check for the existence of a new directives file. This approach has the benefit of reducing the load to stagers as in most cases only one machine per group of nearby updaters needs to get the directives file.

11.3.2. Updater to Content Server State Machine: Fetching Purge Batch Files and Notifying Content Server 1. Updater starts in the idle state upon startup. It has a preconfigured timeout whose expiration forces it to communicate with the content server to ask for the last purge sequence number it has processed (Idle→Getting N).
2. If no answer is received, the updater goes back to the idle state and retries later (Getting N→Idle). Otherwise, it saves the answer from content server (Getting N→Got N). It then proceeds to read the most recent directives file (Got N→Parse File).
3. If the file cannot be parsed, the Updater gives up and goes back to the idle state, possibly reporting its failure (Parse File→Idle). Otherwise, it moves on to check what action is mandated by the directives file (Parse File→Check Action), as defined below.
4. Action could be nothing (i.e., content server's sequence number is equal to the upper end of the directives range) (Check Action→Idle)
5. Action could be that content server is out of date (i.e., content server's sequence number is not in the directives range) (Check Action→Idle). In this case the Updater should raise an alert.
6. Action could be that content server needs to be purged (i.e., content server's sequence number is in the directives range, but is not equal to the Updater end) (Check Action→Fetch). The Updater will fetch the N+1 batch from the stager. If the Updater fails to fetch it, it will report and go back to idle (Fetch→Idle). Otherwise, the Updater will try to allow content server to purge the batch and wait for an acknowledgement (FetchN recent→Wait ack). After getting an acknowledgment, Updater deletes the purge batch file from disk.
7. Waiting for an acknowledgement could result in success (Wait ack→Got N) or failure. In the latter case, the updater gives up and returns to the Idle state (Wait ack→Idle). Notice that if the updater fails repeatedly to purge content server, eventually the content server will fall out of date and the content server must be manually flushed.
8. The process repeats from step 3.

11.3.3. Communication with Content Server

Updater may request that the content server purge a batch of objects and update its sequence number, that the content server return its current sequence number, or that the content server forcibly set its sequence number to some value.

11.3.4. Logging

Updater logs result on fetching or getting a broadcast of the directives file. Results on notifying content server for a purge batch.

11.3.5. Reporting

Updater should report the most recently fetched version of the directives file, and the highest purge sequence number that its content server has processed.

12. Content server

12.1. Inputs

Purge batch files and sequence number queries from updater.

12.2. Outputs

Acks for notifications to Updater.

12.3. Normal Behavior

The following describes behavior in the content server as it pertains to purging.

12.3.1. Content Server to Updater

1. The content server starts in Boot state and reads the persistent value of N upon booting. The content server also initializes the Purge History Table to this value. It then moves to the idle state (Boot→Idle).
2. From the idle state, content server can transition as a result of any of three requests: a request for each value of N, a command to set N, and a command to purge a set of object names in a file.
3. If content server gets a request for N (Idle→Get N), it sends back the value of N it has in memory and moves back to the Idle state (Get N→Idle).
4. If content server is instructed to set N (Idle→Set N), it will attempt to write the new value to disk (Set N→Disk OK). If it succeeds, it will respond with "success" and move back to idle (Disk OK→Idle); otherwise, it will respond with "failure" and return to Idle (Disk OK→Idle).
5. If content server is instructed to purge a file, it will attempt to do the purge (Idle→Purge). If the purge sequence number is not greater than its own (e.g., by 1), content server will reject the request with a failure code. Before purging a particular object name, content server is responsible for updating the sequence number for that object name in the history table. Notice that content server is safe to update the in-memory copy of the sequence number before the purge is successful, as its only side-effect is to force the content server to get an even newer version of an object than it really needs. If content server fails to purge, it will respond with a failure code and go back to idle (Purge→Idle). If content server succeeds, it will also attempt to write the new value of N (should be old N+1) to disk (Purge→Inc N). Notice that this should be done only after the purge has been persistently committed. If content server fails to do so, it will send a failure response and move back to idle (Inc N→Idle); otherwise, it will send a success response and move back to idle (Inc N→Idle). Note that no object name in the batch, no matter how badly formatted, should prevent content server from incrementing N; content server may still return an error code, but it must increment N.

12.3.2. Content Server to Content Server

If content servers share any data amongst each other, they must be careful to ensure that a content server that has already processed a purge request does not receive a "stale" object from another content server which has not yet processed that purge request. A simple scheme is to require that the purge sequence number of the provider of the object include in its response its own purge sequence number. The requester may then consider any object coming from a provider with a lower purge sequence number to be stale. In the middle of processing a purge, it may be that a given provider-requester pair will be unable to share data, even though the relevant data has not been purged. To address this, a history table may be provided or available to the requester to allow the requester to be more lenient in checking the sequence number returned by the provider.

To track which objects have been purged when, the content server preferably maintains the following structures, which are both memory- and time-efficient:

completed_seq_num—a sequence number required_seq_num_table (also called the "history table")—an array of integers that acts like a hash table of object names to sequence numbers. (Note: a full hash table can of course be used, but is not necessary.)

Invariants may be as follows:

All objects in this content server's cache have not been purged between when they were fetched from the origin server and completed_seq_num. In other words, this content server's cache is authoritative up through and including batch completed_seq_num; i.e., if the object has ever been purged (up through batch completed_seq_num) but is still in the server's cache, the object must have been fetched from the origin server (e.g., perhaps via another content server) after the most recent purge for the object (up through batch completed_seq_num) was scheduled.

For any object name x (in cache or not), no purges of x occurred in batches greater than required_seq_num_table [hash (x)] but less than or equal to completed_seq_num.

On startup:

completed_seq_num is read in from persistent state on startup.

All the entries in the required_seq_num_table are then initialized to completed_seq_num.

completed_seq_num is updated persistently to N at some point after content server has finished processing all purge batches through the one numbered N. Note that the results of processing these batches must be persistent at that point.

completed_seq_num is included in responses to other content servers; it indicates that the data returned is guaranteed to be correct with respect to all purge batches through completed_seq_num (and perhaps later).

required_seq_num_table is similar to a hash table: a function is used to hash object names to entries in the table.

required_seq_num_table [i] represents the maximum purge batch sequence number in which a purge has been seen for an object whose object name hashes to i.

required_seq_num_table is updated whenever a purge for a single object is processed: if the object name for the object in the purge batch hashes to bucket i, required_seq_num_table [i] is set to N where N is the number of the purge batch being processed.

A constraint is the following: when content for an object name x is retrieved from another content server, the completed_seq_num returned along with the content must be at least as big as the receiving content server's required_seq_num_table [hash (x)], or else the content must be rejected as stale.

If content server is ever outdated (has completed_seq_num outside of the range of available purges in the directive file), or is behind (has not seen purges in many hours, days, etc.), this content server will have an older sequence number in its completed_seq_num than any content servers than are not in this situation have in their history tables, which implicitly turns off data sharing unless both content servers are also in the same situation. The use of history tables is optional, but desirable for improving performance.

The purge tool of the present invention provides numerous advantages. It provides CDN customers with an effective means to remove content from the CDN as thoroughly and as quickly as possible. The architecture enables the removal of such content on an "as-needed" basis but without adversely impacting the performance of the CDN itself. It is also simple to use and manage. The tool may also be used by CDN administrators as required. In addition, content servers may take advantage of the content delivery network itself to obtain content (namely, purge requests) from staging servers to thereby reduce the load on such servers. The inventive purge architecture also includes means to prevent exchange of stale data between content servers that share files.

Representative purge server and staging servers are Pentium-based computers running the Linux operating system and Apache Web server. One or more of the processes described above are implemented as computer programs, namely, as a set of computer instructions, for performing the functionality described. Purge tool customers use any convenient computer platform having a compatible browser, a valid username and password pair, and Internet access to the CDN portal.

A variant to the above-described embodiment is to implement a design in which purges are pushed from the staging servers to the content servers, e.g., by having each content server establish a persistent connection to some staging server, which would push all new purges down that connection. Another variant is to include one or more additional levels of servers within the purge hierarchy if needed.

Having thus described our invention, the following sets forth what we now claim.

The invention claimed is:

1. A method for identifying and removing given content files, comprising:
   identifying content files to be removed from a set, or a given subset, of content servers in a content delivery network, wherein the content delivery network is operated by a service provider on behalf of participating content providers who use the content servers to cache and serve content files, and wherein the content servers in the content delivery network share content files with each other;
   pushing an aggregate purge request from a central server to each of a set of staging servers, each aggregate purge request including an identifier for each content file to be removed from the set, or the given subset, of content servers;
   periodically, having each of the set, or the given subset, of content servers obtain the aggregate purge request from a given staging server, wherein the content servers obtain the aggregate purge request independently and at different times; and
   at each content server that obtains the aggregate purge request, purging from the content server each content file identified in the aggregate purge request;
   wherein after a first content server has executed the aggregate purge request and, as a result, has purged a given content file, inhibiting the first content server from receiving the given content file from a second content server with which the first content server shares content files if the second content server has received but not then executed the aggregate purge request.

2. The method as described in claim 1 wherein the aggregate purge request is pushed to the each of the set of staging servers over a secure link.

3. The method as describe in claim 1 wherein the aggregate purge request is pulled from the given staging server to each of the set of content servers over a secure link.

4. The method as described in claim 1 further including the step of issuing a notification that each content file identified in the aggregate purge request has been purged from the content delivery network.

5. The method as described in claim 1 further including the step of issuing a notification that each content file identified in the aggregate purge request has been accepted for purging.

6. The method as described in claim 1 wherein the step of identifying the content files to be removed from the content servers includes the step of verifying that a user requesting removal is authorized to purge the content files.

7. The method as described in claim 6 wherein the user is a content delivery network customer.

8. The method as described in claim 6 wherein the user is a content delivery network administrator.

9. In a content delivery network operated by a service provider on behalf of participating content providers, wherein the participating content providers use content servers in the content delivery network to cache and serve content files, and wherein content servers in the content delivery network share content files with each other, the improvement comprising:
   a purge mechanism for selectively identifying and removing given content files from the set, or a given subset, of content servers in the content delivery network, comprising:
      a Web-based interface for identifying content files to be purged from the content servers;

a purge server for receiving purge requests pushed from the Web-based interface, validating each purge request, and batching a set of purge requests into an aggregate purge request;

a set of staging servers for receiving the aggregate purge request pushed from the purge server; and code executing on a given content server for periodically polling a given staging server, for pulling the aggregate purge request, for removing the identified content files from the given content server, and, with respect to a given content file that has been removed from the given content server, for inhibiting the given content server from receiving the given content file from at least one other content server with which the given content server shares content files if the other content server has not then removed the given content file that has been removed by the given content server.

* * * * *